US007625837B2

(12) United States Patent
Dodwell et al.

(10) Patent No.: US 7,625,837 B2
(45) Date of Patent: Dec. 1, 2009

(54) PROCESS FOR THE REMOVAL OF HEAVY METALS FROM GASES, AND COMPOSITIONS THEREFOR AND THEREWITH

(75) Inventors: Glenn W. Dodwell, Bartlesville, OK (US); Joseph B. Cross, Bartlesville, OK (US); Marvin M. Johnson, Bartlesville, OK (US); Edward L. Sughrue, II, Bartlesville, OK (US); Jianhua Yao, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 603 days.

(21) Appl. No.: 11/158,231

(22) Filed: Jun. 21, 2005

(65) Prior Publication Data

US 2006/0286016 A1     Dec. 21, 2006

(51) Int. Cl.
| | |
|---|---|
| *B01J 23/00* | (2006.01) |
| *B01J 23/20* | (2006.01) |
| *B01J 21/00* | (2006.01) |
| *B01J 29/06* | (2006.01) |
| *C01G 29/00* | (2006.01) |
| *C01G 30/00* | (2006.01) |
| *C01D 1/02* | (2006.01) |
| *B01D 53/04* | (2006.01) |

(52) U.S. Cl. ............... 502/353; 502/246; 502/247; 502/354; 502/64; 502/516; 423/594.7; 423/594.15; 423/230

(58) Field of Classification Search ........... 502/103, 502/246, 353, 400, 102, 247, 407–415, 60, 502/63, 64, 68, 69, 250, 516; 423/353
See application file for complete search history.

(56) References Cited

U.S. PATENT DOCUMENTS

| | | | |
|---|---|---|---|
| 1,154,009 A | 9/1915 | Goddard | |
| 3,215,644 A | 11/1965 | Kakinoki et al. | |
| 3,300,280 A | 1/1967 | Terminet | |
| 3,501,897 A | 3/1970 | Van Helden et al. | ........... 55/73 |
| 3,615,196 A * | 10/1971 | Welty et al. | ................ 423/525 |
| 3,704,251 A | 11/1972 | Vrbaski et al. | |
| 3,873,670 A * | 3/1975 | Dugan et al. | ............. 423/210.5 |
| 4,001,376 A | 1/1977 | Cull et al. | .................... 423/244 |
| RE29,145 E * | 3/1977 | Dorn et al. | .................... 502/63 |
| 4,039,478 A | 8/1977 | Cull et al. | ............... 252/455 R |
| 4,059,418 A | 11/1977 | Cull | .............................. 55/73 |
| 4,085,195 A | 4/1978 | Cull et al. | .................... 423/244 |
| 4,126,578 A * | 11/1978 | Sherif | ........................ 502/170 |
| 4,127,591 A * | 11/1978 | Kamimura et al. | .......... 549/260 |
| 4,164,546 A | 8/1979 | Welty, Jr. et al. | ............ 423/239 |
| 4,599,477 A | 7/1986 | Robinson | |
| 4,766,104 A * | 8/1988 | Fennemann | .................. 502/218 |
| 4,781,902 A | 11/1988 | Schoubye | .................... 423/239 |
| 4,931,418 A * | 6/1990 | Cullo et al. | .................. 502/218 |
| 5,075,273 A | 12/1991 | Greene | |
| 5,128,302 A * | 7/1992 | Steinbach et al. | ............ 502/241 |
| 5,607,496 A | 3/1997 | Brooks | ........................ 75/670 |
| 6,027,697 A | 2/2000 | Kurihara et al. | ............. 422/171 |
| 6,248,217 B1 | 6/2001 | Biswas et al. | ............. 204/157.4 |
| 6,362,345 B1 * | 3/2002 | Heidemann et al. | ......... 549/248 |
| 2003/0232723 A1 * | 12/2003 | Dodwell et al. | ............. 502/414 |
| 2005/0129597 A1 | 6/2005 | Cross et al. | |

OTHER PUBLICATIONS

U.S. Appl. No. 10/735,557, Cross et al., filed Dec. 12, 2003.
U.S. Appl. No. 11/066,410, Cross et al., filed Feb. 25, 2005.
U.S. Appl. No. 11/103,903, Cross et al., filed Apr. 12, 2005.
EP06759779 Search Report dated May 7, 2009, 7 pages.

* cited by examiner

*Primary Examiner*—Karl E Group
*Assistant Examiner*—Noah S Wiese

(57) ABSTRACT

A composition, containing vanadium, potassium and a support is disclosed. A method of preparing such composition is also disclosed. The composition is employed in a process to remove a heavy metal from a gaseous feed stream which can optionally include a separate heavy metal adsorption stage.

65 Claims, No Drawings

PROCESS FOR THE REMOVAL OF HEAVY METALS FROM GASES, AND COMPOSITIONS THEREFOR AND THEREWITH

The invention relates to a composition useful in the removal of heavy metals from a gaseous feed stream. In one aspect the invention relates to a method of preparing such composition. In yet another aspect the invention relates to a process for removing heavy metals from a gas stream using the inventive composition and, optionally, a second stage adsorption of the heavy metal.

BACKGROUND OF THE INVENTION

Heavy metals are released during the combustion process of many fossil fuels and/or waste materials. These heavy metals include, for example, arsenic, beryllium, lead, cadmium, chromium, nickel, zinc, mercury and barium. Most of these heavy metals are toxic to humans and animals. In particular, lead is thought to compromise the health and mental acuity of young children and fetuses.

Furthermore, there is every indication that the amount of mercury, and possibly of other heavy metals, now legally allowed to be released by those combusting various fossil fuels and/or waste materials, including coal burning powerplants, chemical plants and petroleum refineries, will be reduced by future legislation. While a variety of adsorbents are available for capture of heavy metals (in particular mercury), these adsorbents tend to have low capacities and are easily deactivated by other components in the gas stream, such as sulfur and nitrogen oxides. We have discovered a material that converts an elemental heavy metal to an oxidation state greater than zero, even in the presence of sulfur and nitrogen oxides.

SUMMARY OF THE INVENTION

It is an object of this invention to provide an improved vanadium and potassium containing material which when used in the removal of heavy metal results in oxidation of the heavy metal to an oxidation state greater than zero, even in the presence of sulfur and nitrogen oxides.

A further object of this invention is to provide a method for making an improved vanadium and potassium containing material which when used in the removal of heavy metal results in oxidation of the heavy metal to an oxidation state greater than zero, even in the presence of sulfur and nitrogen oxides.

Another object of this invention is to provide an improved process for the removal of heavy metal from a heavy metal-containing gas which results in oxidation of the heavy metal to an oxidation state greater than zero, even in the presence of sulfur and nitrogen oxides, with an optional second stage for adsorption of oxidized heavy metal.

In accordance with a first embodiment of the invention, the inventive composition comprises vanadium, potassium and a support selected from the group consisting of: amorphous silica-alumina; a zeolite; a material comprising alumina, expanded perlite, and meta-kaolin; alumina; and combinations thereof.

In accordance with a second embodiment of the invention, the inventive composition can be prepared by the method of:

a) adding a vanadium compound and an acid to a mixture of potassium hydroxide and water to form a first mixture;

b) adding expanded perlite to a mixture of alumina and water to thereby form a second mixture;

c) adding meta-kaolin to the second mixture to thereby form a third mixture;

d) adding a dispersant to the third mixture to thereby form a fourth mixture;

e) combining the first mixture and the fourth mixture to form a fifth mixture;

f) extruding the fifth mixture to form extrudates; and g) calcining the extrudates to thereby form the composition.

In accordance with a third embodiment of the invention, the inventive composition can be used in the removal of heavy metal from a gaseous feed stream comprising heavy metal by contacting, in a contacting zone, the gaseous feed stream with any of the inventive compositions of embodiments one or two above, with an optional second stage for adsorption of oxidized heavy metal.

Other objects and advantages of the invention will become apparent from the detailed description and the appended claims.

DETAILED DESCRIPTION OF THE INVENTION

The inventive composition comprises, consists of, or consists essentially of a support, potassium and vanadium.

The support is selected from the group consisting of: 1) amorphous silica-alumina; 2) a zeolite; 3) a material comprising, consisting of or consisting essentially of alumina, expanded perlite and meta-kaolin; 4) alumina; and 5) combinations thereof. As used in this disclosure, the term "Support" refers to a carrier for another catalytic component. However, by no means is a support necessarily an inert material; it is possible that a support can contribute to catalytic activity and selectivity.

The vanadium is present in the composition, on an elemental vanadium basis, in an amount in the range of from about 6 to about 30 weight %, preferably from about 8 to about 25 weight %, and most preferably from about 11 to about 22 weight %, based on the total weight of the composition.

The potassium is present in the composition, on an elemental potassium basis, in an amount in the range of from about 0.5 to about 25 weight %, preferably from about 1.0 to about 6 weight %, and most preferably from about 1.5 to about 6 weight %, based on the total weight of the composition.

In accordance with the second embodiment of the present invention, the inventive composition can be prepared by the method of, and a method is provided including:

a) adding a vanadium compound and an acid to a mixture of potassium hydroxide and water to form a first mixture;

b) adding expanded perlite to a mixture of alumina and water to thereby form a second mixture;

c) adding meta-kaolin to the second mixture to thereby form a third mixture;

d) adding a dispersant to the third mixture to thereby form a fourth mixture;

e) combining the first mixture and the fourth mixture to form a fifth mixture;

f) extruding the fifth mixture to form extrudates; and g) calcining the extrudates to thereby form the composition.

The vanadium compound can be any vanadium containing compound capable of incorporation onto and/or into a support. Preferably, the vanadium compound is selected from the group consisting of 1) ammonium metavanadate, 2) an alkali metavanadate of the formula $MVO_3$, wherein M can be an alkali metal selected from Group IA, and combinations thereof; 3) vanadium pentoxide; and 4) combinations of any two or more thereof. The most preferable vanadium compound is vanadium pentoxide.

The potassium compound can be any potassium containing compound capable of incorporation onto and/or into a support. Preferably, the potassium compound is potassium hydroxide. The acid is preferably sulfuric acid.

The calcining of step g) preferably comprises heating the extrudates to a temperature in the range of from about 100° C. to about 200° C. for a first time period in the range of from about 0.5 hour to about 2 hours; and subsequently heating the extrudates to a temperature in the range of from about 500° C. to about 750° C. for a second time period in the range of from about 0.5 hour to about 2 hours. Preferably, the resulting support is crushed and sieved to obtain 10 to 40 mesh granules; more preferably 10-20 mesh granules.

In accordance with the third embodiment of the present invention, the inventive composition can be used in the removal of heavy metal from a gaseous feed stream comprising heavy metal by a process comprising, consisting of, or consisting essentially of contacting, in a contacting zone, under heavy metal removal conditions, the gaseous feed stream with any of the inventive compositions, and combinations thereof, of embodiments one through two above. A gaseous product stream is withdrawn from the contacting zone. The gaseous feed stream is typically a combustion gas; and is more typically a stack gas derived from the combustion of coal. The gaseous feed stream can also further comprise compounds selected from the group consisting of sulfur oxides, $CO_2$, water, nitrogen oxides, HCl, and combinations of any two or more thereof.

The contacting of the gaseous feed stream with the inventive composition is preferably carried out at a temperature in the range of from about 100 to about 325° C., more preferably from about 110 to about 275° C., and most preferably from about 120 to about 225° C.

The heavy metal typically comprises a metal selected from the group consisting of arsenic, beryllium, lead, cadmium, chromium, nickel, zinc, mercury, barium, and combinations of any two or more thereof. The heavy metal most typically comprises mercury.

When the heavy metal is mercury, the mercury is typically present in the gaseous feed stream in an amount in the range of from about 0.1 to about 10,000 µg/m³, more typically in the range of from about 1 to about 800 µg/m³ and most typically from about 3 to about 700 µg/m³.

The composition preferably converts at least a portion of the heavy metal in the gaseous feed stream to an elevated oxidation state. In the case of mercury, the composition preferably converts at least a portion of the mercury contained in the gaseous feed stream from a zero oxidation state to a +1 or a +2 oxidation state and also preferably removes mercury. "At least a portion", as used in this paragraph, can mean at least 20 weight %, preferably at least 30 weight %, and more preferably at least 50 weight % mercury based on the total amount of mercury contained in the gaseous feed stream.

The gaseous product stream preferably contains less than about 20 weight %, more preferably less than about 10 weight %, and most preferably less than about 5 weight % of the mercury contained in the gaseous feed stream.

The gaseous product stream is optionally contacted with a separate adsorbent in an adsorption zone. The adsorbent can be any adsorbent capable of adsorbing a heavy metal. More preferably, the adsorbent comprises, consists of or consists essentially of a material selected from the group consisting of a zeolite, amorphous carbon, and combinations thereof. The amorphous carbon can be an activated carbon or an activated charcoal. A treated gaseous product stream is withdrawn from the adsorption zone and contains less than about 20 weight %, preferably less than about 10 weight %, and more preferably less than about 5 weight % of the heavy metal contained in the gaseous feed stream.

EXAMPLES

The following examples are intended to be illustrative of the present invention and to teach one of ordinary skill in the art to make and use the invention. These examples are not intended to limit the invention in any way.

Preparation of Sorbents

Sorbent A

The following is a specific procedure for making a specific Sorbent A sample. Other Sorbent A samples were prepared using the same basic process, but varying the amount of potassium, and the calcination temperatures. In one case the extrudates were crushed and sieved to 25-40 mesh.

A 30 gram quantity of Vista Dispal alumina was mixed with 60 grams of de-ionized water. To this slurry, 60 grams of expanded crushed perlite and 20 grams of ASP-600 metakaolin clay from Engelhard were added.

Separately, a 12.4 gram quantity of potassium hydroxide was dissolved in 60 grams of de-ionized water. A 77.2 gram quantity of vanadium pentoxide was dissolved in the KOH solution. Sulfuric acid (10.84 grams of 98% $H_2SO_4$) was added to turn the potassium hydroxide to potassium sulfate, form a second mixture, and generate freshly precipitated vanadium pentoxide.

The first and second mixtures were then combined into a paste which was then extruded (1/16 inch extrudates) and calcined for one hour at 150° C. This Sorbent A contained about 21.7 wt % V on an elemental basis and about 4.3 wt. % K on an elemental basis.

Sorbent B

To a solution of ammonium metavanadate ($NH_4VO_3$) in 2 molar oxalic acid, a few drops of hydrogen peroxide (50 wt %) were added. (The red color of the solution suggested that vanadium was in +5 oxidation state). The vanadium solution was then impregnated onto a fluidized catalytic cracking unit catalyst (FCCU catalyst) consisting of 20 to 120 micron microspheres by incipient wetness using one-third of the solution in three separate steps. Between impregnation steps, the vanadium-impregnated support was heated to 120° C. in a drying oven for one hour. Sorbent B was calcined for one hour at 150° C. Sorbent B contained 11.2 wt % V on an elemental basis.

Evaluation of Sorbents to Remove Mercury

The following procedure was used to test the ability of the sorbent to remove mercury from a gas stream. Mercury was added by passing a dry air stream at room temperature through a gas bottle containing elemental mercury. The mercury-containing stream was then passed through a sample tube containing a quantity of the sorbent to be tested at a gas hourly space velocity of 10,000 (approximately 40 to 50 ml/min). The tube was located in a furnace held at a temperature of around 150° C. The inlet and outlet elemental mercury concentrations were measured using a Jerome Mercury Analyzer. The efficiency of mercury removal was determined from the amount of mercury entering and leaving the solid sorbent, and is defined as the difference between the inlet and outlet mercury concentrations divided by the inlet concentration.

Sorbents A and B

Table 1 below summarizes the results obtained when passing mercury in dry air and wet air over Sorbents A and B. The removal efficiency was determined as a function of mercury uptake; i.e., the cumulative amount of mercury already adsorbed on the sample in units of micrograms of mercury per gram of sorbent (μg/g).

TABLE 1

Mercury Removal Efficiency

| Sorbent | Wt % V | Wt % K | Size | Reactor Temp. | HG Uptake (μg/g) | Removal Efficiency (%) | Air/Flow Rate (ml/min) |
|---|---|---|---|---|---|---|---|
| A Calcined at 150° C. | 21.7 | 4.3 | 1/16" extrudates | 300° F. | 6.2 | 100 | Dry/100 |
|  |  |  |  | 300° F. | 167.3 | 100 | Dry/100 |
|  |  |  |  | 300° F. | 1048.6 | 100 | Dry/100 |
|  |  |  |  | 275° F. | 1573 | 100 | Dry/100 |
|  |  |  |  | 250° F. | 1684.4 | 100 | Dry/100 |
|  |  |  |  | 250° F. | 1795.8 | 98 | Wet/100 |
|  |  |  |  | 250° F. | 1818.9 | 99 | Wet/100 |
|  |  |  |  | 275° F. | 1956.4 | 97 | Wet/100 |
|  |  |  |  | 275° F. | 2321.3 | 95 | Wet/100 |
|  |  |  |  | 275° F. | 2742.1 | 98 | Wet/100 |
|  |  |  |  | 275° F. | 3399.7 | 98 | Wet/100 |
|  |  |  |  | 275° F. | 3843.9 | 93 | Wet/100 |
| A Calcined at 150° C. | 21.7 | 2.9 | 1/16" extrudates | 300° F. | 0 | 98 | Dry/50 |
|  |  |  |  | 300° F. | 5.8 | 97 | Dry/50 |
|  |  |  |  | 300° F. | 42.1 | 94 | Dry/50 |
|  |  |  |  | 300° F. | 229.6 | 98 | Dry/50 |
|  |  |  |  | 300° F. | 811.9 | 100 | Dry/50 |
|  |  |  |  | 300° F. | 1198.0 | 99 | Dry/50 |
|  |  |  |  | 300° F. | 1552.5 | 98 | Dry/50 |
| A Calcined at 150° C. | 21.7 | 2.2 | 1/16" extrudates | 300° F. | 0.2 | 98 | Dry/50 |
|  |  |  |  | 300° F. | 346.5 | 100 | Dry/50 |
|  |  |  |  | 300° F. | 2052.1 | 100 | Dry/50 |
|  |  |  |  | 300° F. | 3787.3 | 97 | Dry/50 |
|  |  |  |  | 300° F. | 4337.1 | 85 | Dry/50 |
|  |  |  |  | 300° F. | 5174.6 | 76 | Dry/50 |
|  |  |  |  | 300° F. | 5578.8 | 71 | Dry/50 |
|  |  |  |  | 300° F. | 6429.9 | 49 | Dry/50 |
|  |  |  |  | 300° F. | 6630.8 | 38 | Dry/50 |
| A Calcined at 450° C. | 21.7 | 4.3 | 1/16" extrudates | 300° F. | 1.58 | 95.2 | Dry/100 |
|  |  |  |  | 300° F. | 321.6 | 61.8 | Dry/100 |
|  |  |  |  | 300° F. | 881.6 | 81.2 | Dry/100 |
|  |  |  |  | 300° F. | 1942.6 | 89.3 | Dry/100 |
|  |  |  |  | 300° F. | 2510.2 | 66.3 | Dry/100 |
|  |  |  |  | 300° F. | 3806.1 | 65.7 | Dry/100 |
|  |  |  |  | 300° F. | 4015.7 | 60.5 | Dry/100 |
|  |  |  |  | 300° F. | 4030.26 | 31.7 | Dry/200 |
|  |  |  |  | 300° F. | 4081.4 | 43.6 | Dry/200 |
| A Calcined at 300° C. | 21.7 | 4.3 | 1/16" extrudates | 300° F. | 21.3 | 99.3 | Dry/200 |
|  |  |  |  | 300° F. | 1096.1 | 99.3 | Dry/200 |
|  |  |  |  | 300° F. | 1271.0 | 99.6 | Wet/200 |
|  |  |  |  | 300° F. | 2739.9 | 90.2 | Wet/200 |
|  |  |  |  | 300° F. | 3309.5 | 69.0 | Wet/200 |
|  |  |  |  | 300° F. | 3354.2 | 52.8 | Wet/200 |
|  |  |  |  | 300° F. | 3416.2 | 0 | Wet/200 |
|  |  |  |  | 300° F. | 3443.8 | 86.9 | Dry/200 |
|  |  |  |  | 300° F. | 3840.6 | 70.1 | Dry/200 |
|  |  |  |  | 300° F. | 4109.3 | 3.7 | Dry/200 |
|  |  |  |  | 300° F. | 4431.3 | 94.3 | Dry/200 |
|  |  |  |  | 300° F. | 4777.3 | 0 | Dry/200 |
| A Calcined at 300° C. | 21.7 | 4.3 | 1/16" extrudates | 300° F. | 37.8 | 99.8 | Dry/100 |
|  |  |  |  | 300° F. | 720.2 | 100 | Dry/100 |
|  |  |  |  | 300° F. | 1691.9 | 99.9 | Dry/100 |
|  |  |  |  | 300° F. | 2066.0 | 99.9 | Dry/150 |
|  |  |  |  | 300° F. | 2171.0 | 100 | Dry/200 |
|  |  |  |  | 300° F. | 2258.7 | 97.2 | Dry/400 |
|  |  |  |  | 300° F. | 2275.7 | 90.5 | Dry/400 |
|  |  |  |  | 300° F. | 2284.2 | 86.3 | Dry/600 |
|  |  |  |  | 300° F. | 2321.4 | 85.4 | Wet/600 |
|  |  |  |  | 300° F. | 2383.6 | 88.7 | Wet/600 |
|  |  |  |  | 300° F. | 2467.5 | 0 | Wet/600 |

TABLE 1-continued

Mercury Removal Efficiency

| Sorbent | Wt % V | Wt % K | Size | Reactor Temp. | HG Uptake (μg/g) | Removal Efficiency (%) | Air/Flow Rate (ml/min) |
|---|---|---|---|---|---|---|---|
| A Calcined at 150° C. | 21.7 | 4.3 | Crushed and sieved to 25–40 mesh | 300° F. | 6.1 | 100 | Dry/50 |
|  |  |  |  | 300° F. | 214.2 | 100 | Dry/50 |
|  |  |  |  | 300° F. | 1900.7 | 100 | Dry/50 |
|  |  |  |  | 300° F. | 2458.3 | 100 | Dry/50 |
|  |  |  |  | 300° F. | 3014.5 | 100 | Dry/50 |
|  |  |  |  | 300° F. | 3181.6 | 99 | Dry/50 |
| A Calcined at 150° C. | 21.7 | 4.3 | 1/16" extrudates | 300° F. | 27 | 99 | Dry/100 |
|  |  |  |  | 300° F. | 2711.8 | 100 | Dry/100 |
|  |  |  |  | 300° F. | 2784.0 | 99 | Dry/150 |
|  |  |  |  | 300° F. | 3042.1 | 98.9 | Dry/200 |
|  |  |  |  | 300° F. | 3195.9 | 90 | Dry/400 |
|  |  |  |  | 300° F. | 3214.7 | 80.8 | Dry/600 |
|  |  |  |  | 300° F. | 3245.0 | 74 | Dry/600 |
|  |  |  |  | 300° F. | 3348.0 | 68.8 | Dry/600 |
| A Calcined at 300° C. | 21.7 | 4.3 | 1/16" extrudates | 300° F. | 6 | 98.1 | Dry/200 |
|  |  |  |  | 300° F. | 570.2 | 100 | Dry/200 |
|  |  |  |  | 300° F. | 1051.5 | 98.9 | Dry/200 |
|  |  |  |  | 300° F. | 1440.3 | 91.2 | Dry/200 |
|  |  |  |  | 300° F. | 1544.5 | 88.5 | Dry/200 |
|  |  |  |  | 300° F. | 1646.7 | 79.1 | Dry/200 |
|  |  |  |  | 300° F. | 1743.7 | 61.9 | Dry/200 |
|  |  |  |  | 300° F. | 2170.9 | 62.3 | Dry/200 |
| B Calcined at 150° C. | 11.2 | — | 20–120 micron microspheres | 300° F. | 3399.6 | 100 | Dry/30 |
|  |  |  |  | 300° F. | 3596 | 99 | Dry/30 |
|  |  |  |  | 300° F. | 3655 | 98 | Wet/30 |
|  |  |  |  | 300° F. | 3659.3 | 94 | Wet/30 |
|  |  |  |  | 300° F. | 3665.8 | 88 | Wet/30 |
|  |  |  |  | 320° F. | 3671.6 | 86 | Wet/30 |
|  |  |  |  | 320° F. | 3676.4 | 90 | Wet/30 |
|  |  |  |  | 320° F. | 3718.1 | 89 | Wet/30 |
|  |  |  |  | 340° F. | 3730 | 95 | Wet/30 |
|  |  |  |  | 340° F. | 3774.7 | 98 | Wet/30 |
|  |  |  |  | 340° F. | 3847.5 | 97 | Wet/30 |
|  |  |  |  | 340° F. | 4016 | 98 | Wet/30 |
|  |  |  |  | 340° F. | 4172.9 | 98 | Wet/30 |

The results in Table 1 indicate that the efficiency of mercury removal has some dependence upon mercury uptake. In addition, the presence of potassium in Sorbent A appears to have a positive affect on performance as compared to Sorbent B.

Reasonable variations, modifications and adaptations can be made within the scope of the disclosure and appended claims without departing from the scope of the present invention.

That which is claimed is:

1. A composition comprising vanadium, potassium and a support selected from the group consisting of: amorphous silica-alumina; a zeolite; a material comprising alumina, expanded perlite, and meta-kaolin; alumina; and combinations thereof; wherein said vanadium is present in said composition, on an elemental vanadium basis, in an amount in the range of from about 6 to about 30 wt. percent, based on the total weight of said composition; and wherein said vanadium is in the form of vanadium pentoxide.

2. A composition in accordance with claim 1 wherein said vanadium is present in said composition, on an elemental vanadium basis, in an amount in the range of from about 8 to about 25 wt. percent, based on the total weight of said composition.

3. A composition in accordance with claim 1 wherein said vanadium is present in said composition, on an elemental vanadium basis, in an amount in the range of from about 11 to about 22 wt. percent, based on the total weight of said composition.

4. A composition in accordance with claim 1 wherein said potassium is present in said composition, on an elemental potassium basis, in an amount in the range of from about 0.5 to about 25 wt. percent, based on the total weight of said composition.

5. A composition in accordance with claim 1 wherein said potassium is present in said composition, on an elemental potassium basis, in an amount in the range of from about 1.0 to about 6 wt. percent, based on the total weight of said composition.

6. A composition in accordance with claim 1 wherein said potassium is present in said composition, on an elemental potassium basis, in an amount in the range of from about 1.5 to about 6 wt. percent, based on the total weight of said composition.

7. A composition consisting essentially of vanadium, potassium and a support selected from the group consisting of: amorphous silica-alumina, a zeolite; a material comprising alumina, expanded perlite, and meta-kaolin; alumina; and combinations thereof; wherein said vanadium is present in said composition, on an elemental vanadium basis, in an amount in the range of from about 6 to about 30 wt. percent, based on the total weight of said composition.

8. A composition consisting of vanadium, potassium and a support selected from the group consisting of: amorphous silica-alumina; a zeolite; a material comprising alumina, expanded perlite, and meta-kaolin; alumina; and combinations thereof; wherein said vanadium is present in said composition, on an elemental vanadium basis, in an amount in the range of from about 6 to about 30 wt. percent, based on the total weight of said composition.

9. A composition prepared by the method of:
a) adding a vanadium compound and an acid to a mixture of potassium hydroxide and water to form a first mixture;
b) adding expanded perlite to a mixture of alumina and water to thereby form a second mixture;
c) adding meta-kaolin to said second mixture to thereby form a third mixture;
d) adding a dispersant to said third mixture to thereby form a fourth mixture;
e) combining said first mixture and said fourth mixture to form a fifth mixture;
f) extruding said fifth mixture to form extrudates; and
g) calcining said extrudates to thereby form said composition;
wherein vanadium is present in said composition, on an elemental vanadium basis, in an amount in the range of from about 6 to about 30 wt. percent, and wherein potassium is present in said composition, on an elemental potassium basis, in an amount in the range of from about 0.5 to about 25 wt. percent, based on a total weight of said composition; and wherein said vanadium is in the form of vanadium pentoxide.

10. A composition in accordance with claim 9 wherein said acid is sulfuric acid.

11. A composition in accordance with claim 9 wherein said extrudates are calcined for a time period in the range of from about 0.5 to about 2 hours at a temperature in the range of from about 500° C. to about 750° C.

12. A composition in accordance with claim 9 wherein vanadium is present in said composition, on elemental vanadium basis, in an amount in the range of from about 8 to about 25 wt. percent, and wherein potassium is present in said composition, on an elemental potassium basis, in an amount in the range of from about 1.0 to about 6 wt. percent, based on a total weight of said composition.

13. A composition in accordance with claim 9 wherein vanadium is present in said composition, on elemental vanadium basis, in an amount in the range of from about 11 to about 22 wt. percent, and wherein potassium is present in said composition, on an elemental potassium basis, in an amount in the range of from about 1.5 to about 6 wt. percent, based on a total weight of said composition.

14. A method comprising;
a) adding vanadium pentoxide and an acid to a mixture of potassium hydroxide and water to form a first mixture;
b) adding said expanded perlite to a mixture of alumina and water to thereby form a second mixture;
c) adding meta-kaolin to said second mixture to thereby form a third mixture;
d) adding a dispersant to said third mixture to thereby form a fourth mixture;
e) combining said first mixture and said fourth mixture to form a fifth mixture;
f) extruding said fifth mixture to form extrudates; and
g) calcining said extrudates to thereby form a composition that comprises vanadium, potassium and a support selected from the group consisting of: amorphous silica-alumina; a zeolite; a material comprising the alumina, the expanded perlite, and the meta-kaolin; the alumina; and combinations thereof; wherein the vanadium is present in the composition, on an elemental vanadium basis, in the range of from about 6 to about 30 wt. percent, based on the total weight of the composition; and wherein the vanadium is in the form of the vanadium pentoxide.

15. A method in accordance with claim 14 wherein said acid is sulfuric acid.

16. A method in accordance with claim 14 wherein said extrudates are calcined for a time period in the range of from about 0.1 to about 24 hours at a temperature in the range of from about 500° C. to about 750° c.

17. A method in accordance with claim 14 wherein potassium is present in said composition, on an elemental potassium basis, in an amount in the range of from about 0.5 to about 25 wt. percent, based on the total weight of said composition.

18. A method in accordance with claim 14 wherein vanadium is present in said composition, on elemental vanadium basis, in an amount in the range of from about 8 to about 25 wt. percent, and wherein potassium is present in said composition, on an elemental potassium basis, in an amount in the range of from about 1.0 to about 25 wt. percent, based on the total weight of said composition.

19. A method in accordance with claim 14 wherein vanadium is present in said composition, on elemental vanadium basis, in an amount in the range of from about 11 to about 22 wt. percent, and wherein potassium is present in said composition, on an elemental potassium basis, in an amount in the range of from about 1.5 to about 6 wt. percent, based on the total weight of said composition.

20. A process comprising:
a) contacting, in a contacting zone, a gaseous feed stream comprising a heavy metal and oxygen with the composition of claim 1; and
b) withdrawing a gaseous product stream from said contacting zone.

21. A process as recited in claim 20 wherein said gaseous product stream contains less heavy metal than said gaseous feed stream.

22. A process as recited in claim 20 wherein said gaseous feed stream further comprises a compound selected from the group consisting of sulfur oxides, $CO_2$, water, nitrogen oxides, HC1, and combinations of any two or more thereof.

23. A process as recited in claim 20 wherein said gaseous feed stream is a combustion gas.

24. A process as recited in claim 20 wherein said gaseous feed stream is a stack gas derived from the combustion of coal.

25. A process as recited in claim 20 wherein said contacting of step a) is carried out at a temperature in the range of from about 100 to about 325° C.

26. A process as recited in claim 20 wherein said contacting of step a) is carried out at a temperature in the range of from about 110 to about 275° C.

27. A process as recited in claim 20 wherein said contacting of step a) is carried out at a temperature in the range of from about 120 to about 225° C.

28. A process as recited in claim 20 wherein said heavy metal comprises a metal selected from the group consisting of arsenic, beryllium, lead, cadmium, chromium, nickel, zinc, mercury, barium, and combinations of any two or more thereof.

29. A process as recited in claim 28 wherein said heavy metal is mercury.

30. A process as recited in claim 29 wherein said composition converts at least a portion of said mercury in said gaseous feed stream from a zero oxidation state to a +1 or a +2 oxidation state.

31. A process as recited in claim 29 wherein said mercury is present in said gaseous feed stream in an amount in the range of from about 0.1 to about 10,000 µg/m³.

32. A process as recited in claim 29 wherein said mercury is present in said gaseous product stream in an amount in the range of from about 1 to about 800 µg/m$^3$.

33. A process as recited in claim 29 wherein said mercury is present in said gaseous product stream in an amount in the range of from about 3 to about 700 µg/m$^3$.

34. A process as recited in claim 29 wherein said gaseous product stream contains less than about 20 weight % of the mercury contained in said gaseous feed stream.

35. A process as recited in claim 29 wherein said gaseous product stream contains less than about 10 weight % of the mercury contained in said gaseous feed stream.

36. A process as recited in claim 29 wherein said gaseous product stream contains less than about 5 weight % of the mercury contained in said gaseous feed stream.

37. A process as recited in claim 20 wherein said gaseous product stream is contacted, in an adsorption zone, with an adsorbent selected from the group consisting of a zeolite, amorphous carbon, and combinations thereof.

38. A process as recited in claim 37 wherein said composition oxidizes at least a portion of said heavy metal in said gaseous feed stream to an elevated oxidation state.

39. A process as recited in claim 37 wherein said heavy metal is mercury and wherein said composition oxidizes at least a portion of said mercury in said gaseous feed stream from a zero oxidation state to a +1 or a +2 oxidation state.

40. A process as recited in claim 37 wherein a treated gaseous product stream is withdrawn from said adsorption zone, and wherein said treated gaseous product stream contains less than about 20 weight % of the heavy metal contained in the gaseous feed stream.

41. A process as recited in claim 37 wherein a treated gaseous product stream is withdrawn from said adsorption zone, and wherein said treated gaseous product stream contains less than about 10 weight % of the heavy metal contained in the gaseous feed stream.

42. A process as recited in claim 37 wherein a treated gaseous product stream is withdrawn from said adsorption zone, and wherein said treated gaseous product stream contains less than about 5 weight % of the heavy metal contained in the gaseous feed stream.

43. A process comprising:
  a) contacting, in a contacting zone, a gaseous feed stream comprising a heavy metal and oxygen with the composition of claim 9; and
  b) withdrawing a gaseous product stream from said contacting zone.

44. A process as recited in claim 43 wherein said gaseous product stream contains less heavy metal than said gaseous feed stream.

45. A process as recited in claim 43 wherein said gaseous feed stream further comprises a compound selected from the group consisting of sulfur oxides, $CO_2$, water, nitrogen oxides, HCl, and combinations of any two or more thereof.

46. A process as recited in claim 43 wherein said gaseous feed stream is a combustion gas.

47. A process as recited in claim 43 wherein said gaseous feed stream is a stack gas derived from the combustion of coal.

48. A process as recited in claim 43 wherein said contacting of step a) is carried out at a temperature in the range of from about 100 to about 325° C.

49. A process as recited in claim 43 wherein said contacting of step a) is carried out at a temperature in the range of from about 110 to about 275° C.

50. A process as recited in claim 43 wherein said contacting of step a) is carried out at a temperature in the range of from about 120 to about 225° C.

51. A process as recited in claim 43 wherein said heavy metal comprises a metal selected from the group consisting of arsenic, beryllium, lead, cadmium, chromium, nickel, zinc, mercury, barium, and combinations of any two or more thereof.

52. A process as recited in claim 51 wherein said heavy metal is mercury.

53. A process as recited in claim 52 wherein said composition converts at least a portion of said mercury in said gaseous feed stream from a zero oxidation state to a +1 or a +2 oxidation state.

54. A process as recited in claim 52 wherein said mercury is present in said gaseous feed stream in an amount in the range of from about 0.1 to about 1000 µg/m$^3$.

55. A process as recited in claim 52 wherein said mercury is present in said gaseous product stream in an amount in the range of from about 1 to about 800 µg/m$^3$.

56. A process as recited in claim 52 wherein said mercury is present in said gaseous product stream in an amount in the range of from about 3 to about 700 µg/m$^3$.

57. A process as recited in claim 52 wherein said gaseous product stream contains less than about 20 weight % of the mercury contained in said gaseous feed stream.

58. A process as recited in claim 52 wherein said gaseous product stream contains less than about 10 weight % of the mercury contained in said gaseous feed stream.

59. A process as recited in claim 52 wherein said gaseous product stream contains less than about 5 weight % of the mercury contained in said gaseous feed stream.

60. A process as recited in claim 43 wherein said gaseous product stream is contacted, in an adsorption zone, with an adsorbent selected from the group consisting of a zeolite, amorphous carbon, and combinations thereof.

61. A process as recited in claim 60 wherein said composition oxidizes at least a portion of said heavy metal in said gaseous feed stream to an elevated oxidation state.

62. A process as recited in claim 60 wherein said heavy metal is mercury and wherein said composition oxidizes at least a portion of said mercury in said gaseous feed stream from a zero oxidation state to a +1 or a +2 oxidation state.

63. A process as recited in claim 60 wherein a treated gaseous product stream is withdrawn from said adsorption zone, and wherein said treated gaseous product stream contains less than about 20 weight % of the heavy metal contained in the gaseous feed stream.

64. A process as recited in claim 60 wherein a treated gaseous product stream is withdrawn from said adsorption zone, and wherein said treated gaseous product stream contains less than about 10 weight % of the heavy metal contained in the gaseous feed stream.

65. A process as recited in claim 60 wherein a treated gaseous product stream is withdrawn from said adsorption zone, and wherein said treated gaseous product stream contains less than about 5 weight % of the heavy metal contained in the gaseous feed stream.

* * * * *

UNITED STATES PATENT AND TRADEMARK OFFICE
CERTIFICATE OF CORRECTION

PATENT NO. : 7,625,837 B2 Page 1 of 1
APPLICATION NO. : 11/158231
DATED : December 1, 2009
INVENTOR(S) : Dodwell et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1131 days.

Signed and Sealed this

Twenty-first Day of December, 2010

David J. Kappos
*Director of the United States Patent and Trademark Office*